US008539006B2

(12) United States Patent
Anderson et al.

(10) Patent No.: US 8,539,006 B2
(45) Date of Patent: Sep. 17, 2013

(54) LOGICAL CHART OF ACCOUNTS WITH HASHING

(75) Inventors: Jeffrey Anderson, West Fargo, ND (US); William Frandsen, Fargo, ND (US); John Healy, Fargo, ND (US); Steven Degele, Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 343 days.

(21) Appl. No.: 12/916,821

(22) Filed: Nov. 1, 2010

(65) Prior Publication Data
US 2012/0109698 A1 May 3, 2012

(51) Int. Cl.
*G06F 17/30* (2006.01)

(52) U.S. Cl.
USPC .............. 707/807; 707/950; 707/944; 705/30

(58) Field of Classification Search
None
See application file for complete search history.

(56) References Cited

U.S. PATENT DOCUMENTS

| | | | |
|---|---|---|---|
| 5,390,113 A * | 2/1995 | Sampson | 705/30 |
| 6,684,384 B1 | 1/2004 | Bickerton et al. | |
| 7,197,480 B1 | 3/2007 | Chollon et al. | |
| 7,433,887 B2 | 10/2008 | Thakkar et al. | |
| 7,580,916 B2 | 8/2009 | Nelson et al. | |
| 2006/0224473 A1 | 10/2006 | Nelson et al. | |
| 2007/0130032 A1 | 6/2007 | Nelson et al. | |
| 2010/0318572 A1 * | 12/2010 | Ng et al. | 707/791 |
| 2010/0318926 A1 * | 12/2010 | Anderson et al. | 715/763 |
| 2011/0055055 A1 * | 3/2011 | Du et al. | 705/30 |

OTHER PUBLICATIONS

"SQL Kudler's Accounting Dept Service Request" Retrieved at <<http://www.brainmass.com/homework-help/computer-science/databases/147434>>, Aug. 11, 2010, pp. 10.
"Microsoft Dynamics NAV", Retrieved at <<http://bcinc.net/general_ledger.html>>, Aug. 11, 2010, pp. 2.
"SA/ERP Cube Wizard User Guide", Retrieved at << http://publib.boulder.ibm.com/infocenter/rsdp/v1r0m0/topic/com.ibm.help.download.saerp.doc/pdf/Cube%20Wizard%20User%20Guide.pdf>>, Aug. 11, 2010, pp. 15.
"Oracle Retail Merchandising Integration Pack for PeopleSoft Enterprise Financials: Financial Operations Control", Retrieved at <<http://www.oracle.com/us/products/applications/057062.pdf>>, Aug. 11, 2010, pp. 4.

* cited by examiner

*Primary Examiner* — Pierre Vital
*Assistant Examiner* — David T Brooks
(74) *Attorney, Agent, or Firm* — Turk IP Law, LLC

(57) ABSTRACT

A Chart of accounts (COA) is maintained as a logical set of constraints, criteria, and relationships and does not persist any of the valid combinations until a first time a particular combination is used. When any business logic or properties need to be set or referenced on an individual combination, that combination is physically persisted "just in time" and then becomes a physical combination that may be used going forward. A hash value is associated with each combination such that lookups are simplified.

19 Claims, 6 Drawing Sheets

LOGICAL CHART OF ACCOUNTS WITH HASHING

BACKGROUND

Enterprise Resource Planning (ERP) systems manage internal and external resources of an organization including tangible assets, financial resources, materials, and human resources. ERP systems facilitate the flow of information between all organizational/business functions inside the boundaries of the organization and manage the connections to outside stakeholders. An ERP system may either reside on a centralized server or be distributed across modular hardware and software units that provide the services and communicate over one or more networks. The distributed design may allow an organization to assemble modules from different vendors without the need for the placement of multiple copies of complex and expensive computer systems in areas which do not use their full capacity.

In a traditional ERP system, a Chart of Accounts (COA) represents a combination of dimensions and may be persisted as a physical list of possible combinations. This means all valid combinations of account codes and other segments are also persisted, which may take hours or days to generate and may become impossible after a certain number of combinations. Some systems move the other segments of the combination outside of the actual COA and instead add them simply as reporting hierarchies or other pieces of data that get tagged on during usage. While such mechanisms may reduce the need for processing resources, they do not allow the granular level of control necessary at an individual combination level that is desired by many public sector companies.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to maintaining the COA as a logical set of constraints, criteria, and relationships and not persist any of the valid combinations until a first time a particular combination is used. When any business logic or properties need to be set or referenced on an individual combination, that combination may be physically persisted "just in time" and then become a physical combination that may be used going forward. According to some embodiments, a hash value may be associated with each combination such that lookups are simplified.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
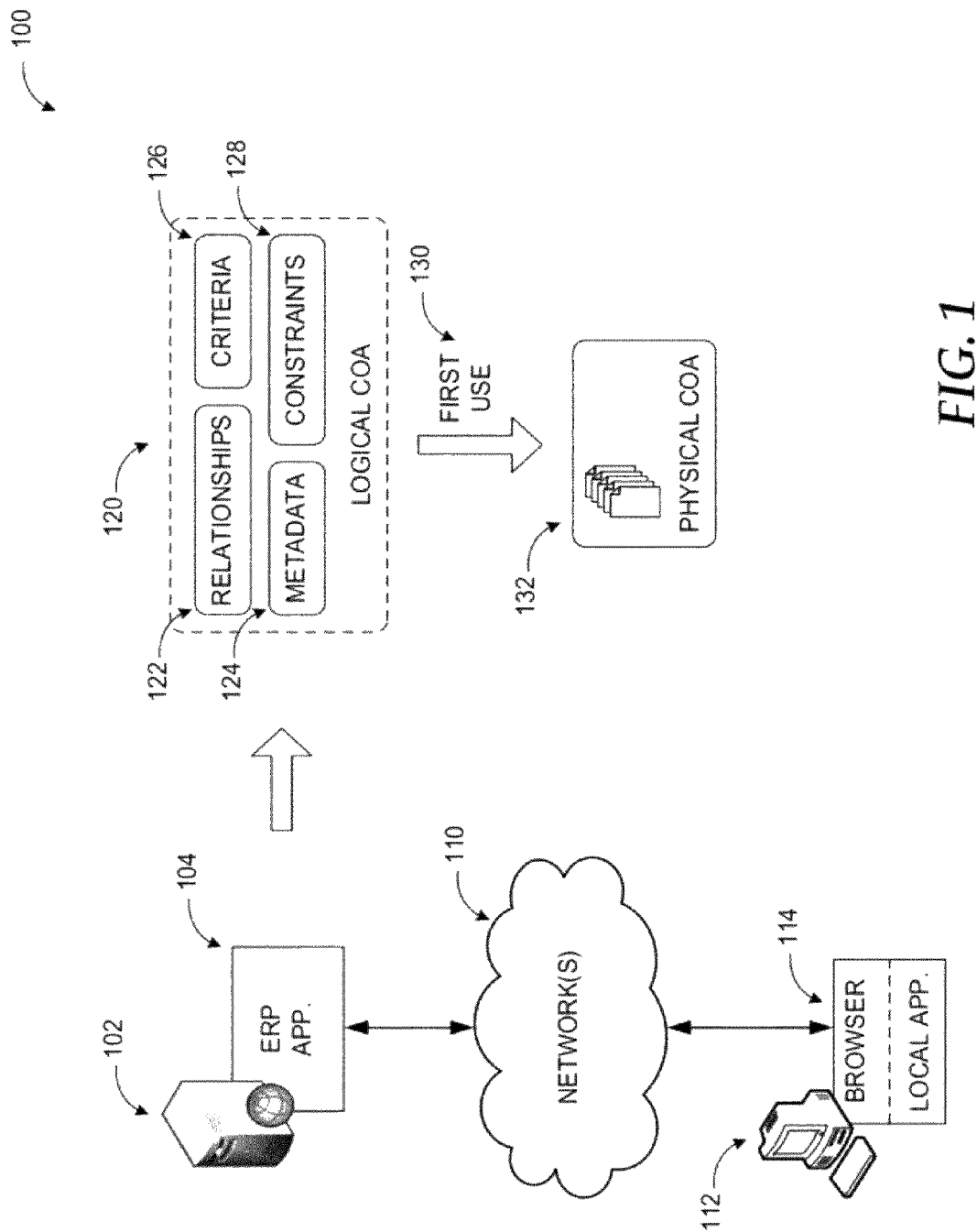
FIG. 1 is a conceptual diagram illustrating an example networked ERP environment, where embodiments may be implemented.

As briefly described above, a logical COA may be stored as a set of metadata, constraints, criteria and relationships. COA combinations may be generated as they are referenced for the first time and a hash code may be used to simplify the check process to see if a combination already exists and to load it if it does. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable storage media.

Throughout this specification, the term "platform" may be a combination of software and hardware components for enterprise resource planning operations. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, a conceptual diagram 100 of an example networked ERP environment, where embodiments may be implemented, is illustrated. An ERP application 104 executed on server 102 may be part of a distributed (or centralized) system and provide one or more of accounting, product lifecycle management, human resources, supply chain management, customer relationship management, warehouse management, and comparable services.

Users may access the services provided by ERP application 104 through a browser or client application 114 executed on computing device 112 via network(s) 110. In an ERP system, a Chart of Accounts (COA) represents a combination of accounts and other segments. A relational COA typically contains only a main account, and additional segments are loosely related for later use in posting. In this case a number of valid combinations of these values may reach easily trillions or more, so combinations cannot be persisted. Because of this, systems supporting relational COA's commonly allow a single segment in the account structure, the main account. Such systems are usually employed in commercial sector businesses.

Public sector businesses, on the other hand, typically require that the official COA contain not only the main account, but also additional segments since they need to control and set properties at the combination level. This is referred to as a linear COA. This approach restricts the ERP applications to a relatively small number of combinations since they pre-generate all the valid combinations at the time the COA is defined.

Embodiments enable a single implementation to support both a relational COA and a linear COA with the same business logic. A true linear COA 120 may be set up even if it potentially generates a very large number of combinations, since the combinations are not created until first used by business logic. This is accomplished by storing the COA 120 as a set of metadata 124, constraints 128, criteria 126 and relationships 122. The metadata 124 defines which segments exist, what type of data they hold and in which structures for the COA 120. The constraints 128 and criteria 126 then filter down the set of valid combinations based on which values exist in other segments. This set may be further filtered down through relationships 122, which categorize values or relate them directly with each other. These components may be stored as metadata in the system, and no physical combinations are created at the time of definition.

The first time business logic needs to reference a physical combination (132), either to track a value or set a property on it, the combination may be physically persisted if it does not already exist. From that point on that one physical instance may be referenced if future business logic needs to reference it. From a consumer standpoint, all valid combinations logically exist at all times. The act of physically persisting the combination may be abstracted from consumers through a class library that ensures the values physically exist when requested. The physical list of valid combinations created after first use (130) forms the physical COA 132, which is significantly smaller in size than the logical COA 120.

Combinations may be complex, contain data in multiple tables, and can be infinitely long. Therefore, the process of determining if a given combination physically exists yet can be very resource-costly. Even if the user knows the combination exists, finding that combination can similarly be resource-expensive since the display value of the combination may not necessarily uniquely identify it. To provide a fast lookup process, a hashing mechanism may be employed according to some embodiments.

As a user or business logic builds up a combination definition in the class hierarchy, items like which values are in each segment, which hierarchies are being used, and/or other values may be tracked. At the time a consumer requests a physical combination, the data may be hashed together using a predefined hash to obtain a value for the combination. This unique hash may be stored on the physical combination as a column. Thus, looking up a particular combination involves an indexed lookup by the hash value. From there, all related data may be discovered by traversing standard foreign key relationships in the database. Any number of hashing mechanisms may be employed using the principles described herein. According to an example embodiment, SHA1 hashing may be implemented with minimized possibility of a hash collision combined with the relatively small storage size of 20 bytes.

Figure 2:
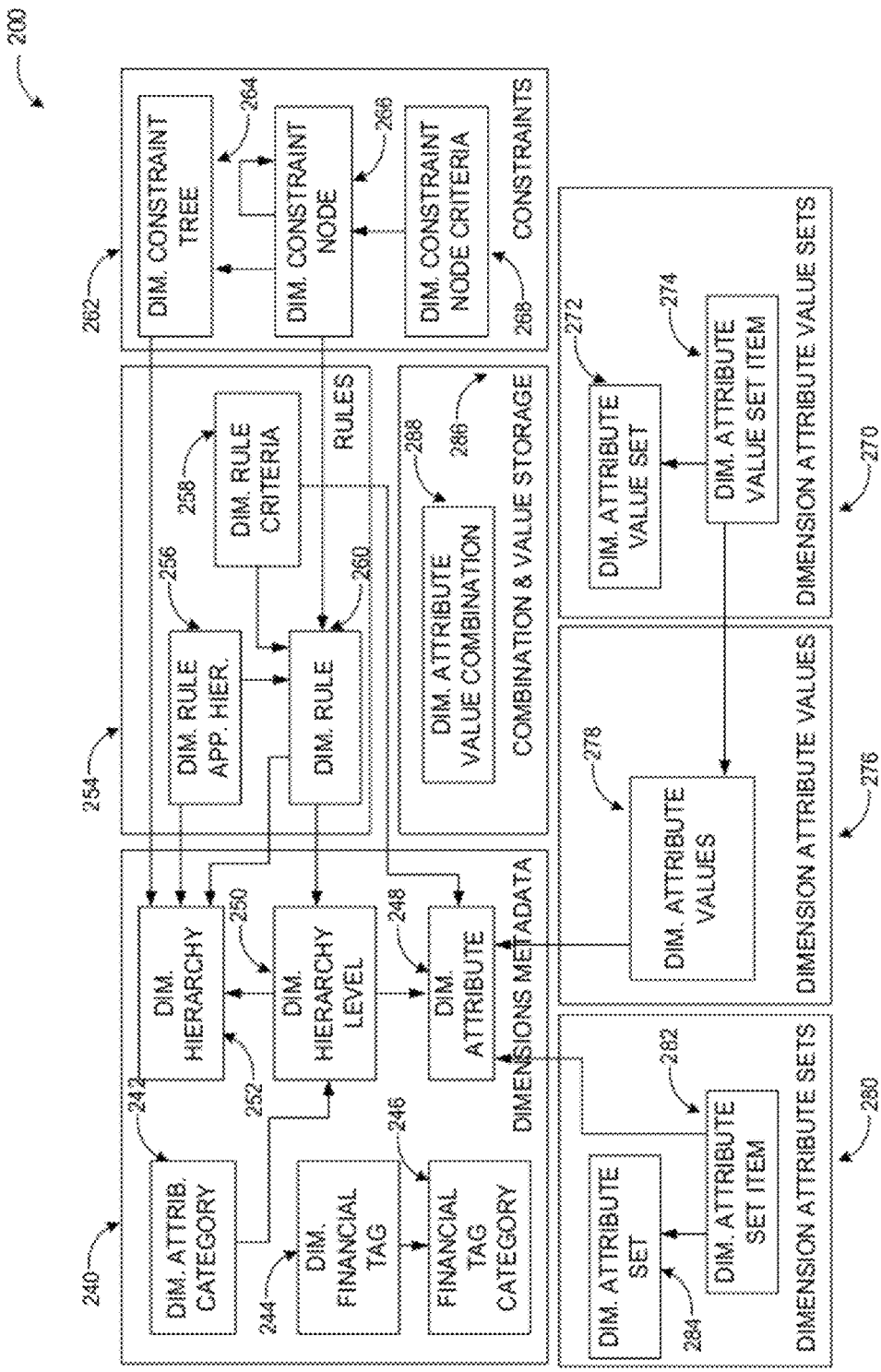
FIG. 2 illustrates an overview of components and modules of an ERP system with logical COA.

FIG. 2 illustrates in diagram 200 an overview of components and modules of an ERP system with logical COA. To enhance lookup performance when physical COA combinations reach high numbers, a hash may be computed and stored in the index column for each combination according to some embodiments. The hash may include key information about the combination. The key information may include a total number, identifier and/or value of each segment; a total number, identifier, and order of each hierarchy; a number of segments related to each hierarchy; and additional information. The hash may be computed as a large multi-byte hash and stored as an index on the root combination value table.

The combination storage may have a single unique combination stored when non-transient status is specified. A non-transient combination is one that needs to persist forever and can never be changed or deleted because the object that references it also can never be changed or deleted with the exception that it can have a display value and combination string updated due to a system wide dimension attribute value change. The single non-transient combination may be referenced by multiple non-transient or transient objects.

Transient combinations may be referenced by one transient object. No reference counting is needed for transient combination since there is a one-to-one reference. Thus, as soon as the source object is deleted, the transient combination is also deleted combination because no one else will reference it. Therefore, during the save process, the combination may be flagged indicating whether it is part of a transaction and whether it is transient. Based upon this information, a DimensionStorage class may perform update, delete, or insert actions with a different combination.

In a system according to embodiments, there may be two levels of transient indicators. The first level may be on the main combination itself. The second level may be on any sub-combinations associated with a particular hierarchy. It is possible that a transient main combination may contain sub-combinations that are both transient and non-transient, as it may attempt to reuse any non-transient sub-combinations if they exist before it creating a transient one. If the main transient combination is deleted, only the transient sub-combinations may be deleted.

In the logical COA model displayed in diagram 200, metadata within the logical COA (Dimensions Metadata 240) stores information about which dimension attributes exist and where the values for those dimension attributes are stored. The logical model for the metadata may include attributes Dimension Attributes 248, which are kinds of data that can be tracked for the dimension system. Examples include main accounts, departments, purposes, cost centers, trucks, product lines, and comparable ones. Dimension attributes may be entity-backed or custom lists. Information about available values and which columns need to be used as key, value and name from an entity may be specified as parallel foreign keys to an attribute. If a specified entity can be categorized, then Dimension Attribute Category 242 may be used to track the valid categories for that dimension attribute.

Dimension Hierarchies 252 are ordered sets of Dimension Attributes 248 used to define which pieces of data are to be tracked. They may contain Dimension Hierarchy Level 250 instances, which provide ordering and link to the Dimension Attributes 248. Some dimension hierarchies may be marked as account structures through an account structure flag. To avoid de-normalization and appropriately express the functional dependency, both Dimension Hierarchy 252 and Dimension Hierarchy Level 250 may need to be broken into complete sub types with the foreign key moved down to the sub type level.

If the dimension attributes are organized in sets (Dimension Attribute Sets 280), each Dimension Attribute Set Item 282 may be linked to Dimension Attributes 248 and report to a Dimension Attribute Set 284. Dimension Attribute Values 276 model contains individual Dimension Attribute Values (278) for Dimension Attributes 248. Dimension Attribute Value Sets 270 contain individual Dimension Attribute Value Set Items 274, which are linked to Dimension Attribute Values 278 and report to Dimension Attribute Value Set 272.

Constraints 262 allow the user to describe valid combinations of dimension information. Constraints may be represented as a hierarchical tree (Dimension Constraint Tree 264), where each node (shown as Dimension Constraint Node 266) contains criteria (Dimension Constraint Node Criteria 268) indicating when that node is valid. As the user begins entering dimension information any nodes with invalid constraints may become invalid and the constraint tree may thus be trimmed down restricting future value entry by the user.

Criteria for constraints may be wildcard or range criteria and may be tracked as types of Dimension Constraint Node Criteria 268. Explicit ranging and wildcarding may be used to allow for enhanced performing evaluation of constraints. Rules 254 specify additional hierarchies and trees (Dimension Rule Applied Hierarchies 256) to be entered by the user when a specific account root is used. This is represented in the model as a join entity between Dimension Constraint Tree 264 and an account root. When the specified account root is used on a transaction, all associated Dimension Hierarchies 252 may be appended to the account control for user entry. Rules 254 also include Dimension Rule Criteria 258, which together with Dimension Rule Applied Hierarchies 256 feed to Dimension Rules 260.

Figure 3:
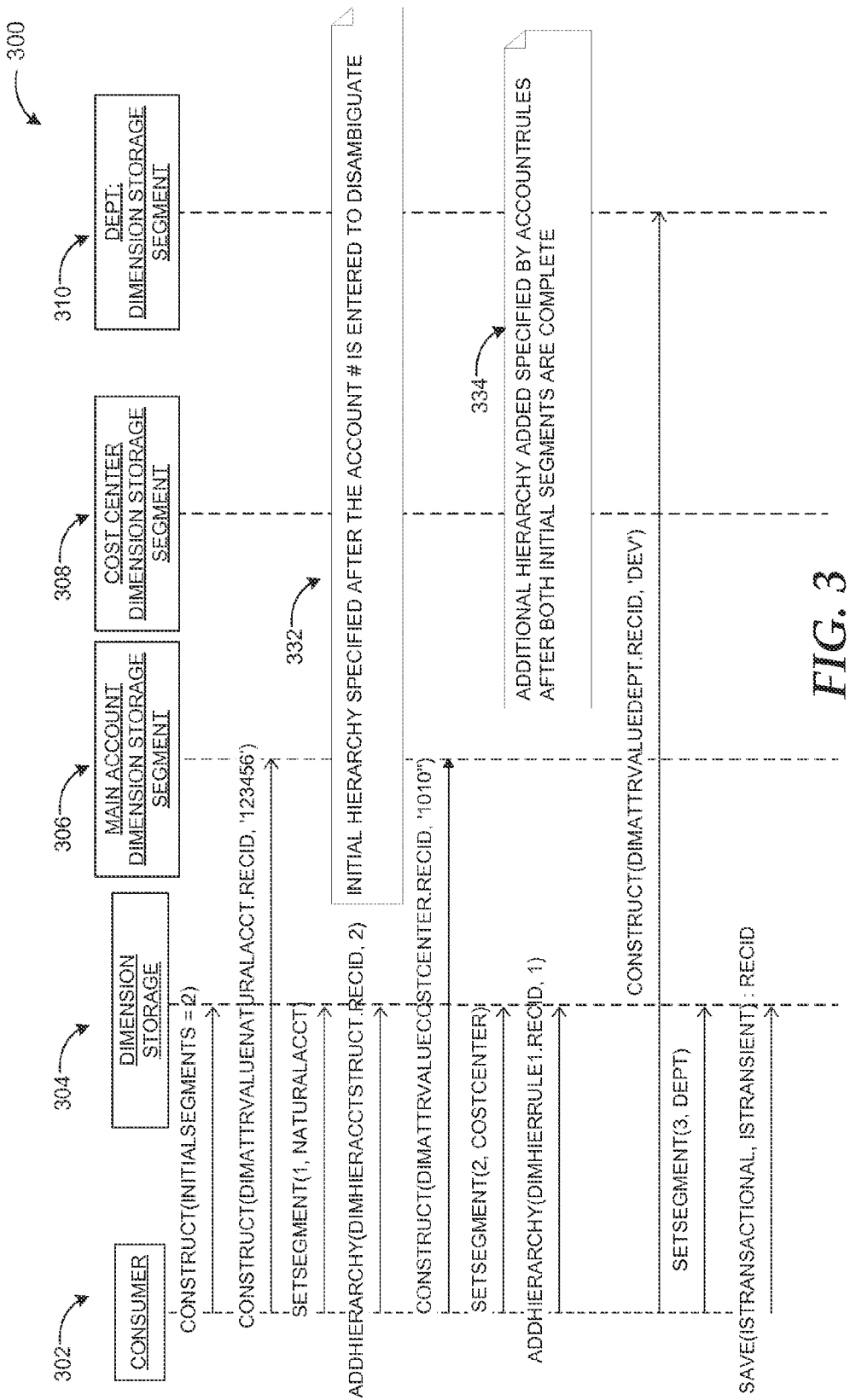
FIG. 3 illustrates a sequence diagram for an example consumer interaction for creating a new combination.

FIG. 3 illustrates a sequence diagram for an example consumer interaction for creating a new combination. The sequence diagram 300 shows the consumer interaction with the example DimensionStorage and DimensionStorageSegment classes when creating a new combination. The example shows the entry of a three segment combination, where the first two segments represent the ledger account and the last segment is an added dimension triggered by an account rule based on the ledger account selected. The example combination and components in sequence diagram 300 are provided for illustrative purposes only.

The DimensionStorage class may support the storage and retrieval of any combination of dimension values by tracking an ordered list of hierarchies and segments. It may hide the implementation details of transactional storage across the distinct tables for any value combination. Key functionality of the storage class may include the ability to set segments before knowing the initial hierarchy; mapping hierarchies to a number of segments, optionally increasing the total number of segments tracked; setting/retrieval/clearing of a segment by absolute left to right index; performance of single save calls to persist and return a foreign key reference to the combination; management of transient and transactional properties; performance of single find calls to retrieve and hydrate all the hierarchies and segments based on the combination foreign key; synchronization of display values when dimension attribute values identifiers are changed; fix-up of data when the dimension hierarchy structure is changed; and marking of an existing transient combination as non-transient.

The DimensionStorage class may be agnostic to any rules, constraints or enterprise relation restrictions and assume all validation has already occurred and the combination it is provided is valid and can be persisted (or the retrieved combination is still valid).

The DimensionStorageSegment class may provide an encapsulation of the two key pieces of data that are tracked for each segment stored in a dimension combination. The first piece is the string value that a user has entered in the segment and appears on the user interface. The second piece is a foreign key to the attribute value that the value was resolved to at the initial time of entry. This class may be used simply as a data container by the DimensionStorage class.

Account and dimension value combinations may be stored on transactions as a single reference identifier into a combination table. Any segments that appear on the chart of accounts page may be grouped into a ledger account type, and the remaining segments may be grouped into a non-ledger account type. The hierarchy and constraint tree may be defined on the full account structure and not one of these sub-groups. Therefore, the foreign key to a constraint node group may reside at the account number level. A physical model for combination storage may be significantly different from the logical model because query performance is a priority consideration as many processes in the system are based upon account information. Furthermore, the combination information is likely one of the larger tables in the system if dimensions are used extensively meaning value storage needs to be as compact as possible without hurting performance.

A combination hash is a property on attribute value combination that does not exist in the logical model. Each time a user enters a full combination, the next query needs to determine if that full combination already exists and if so return the identifier of the combination. As discussed above, this potentially resource-expensive query may be enhanced with a hash value computed for the combination and stored in an index column. This allows for fast lookups of a given combination. The hash may be computed based on user input and a simple index lookup may be performed to see if the value exists and to return its identifier.

As shown in sequence diagram 300, consumer 302 provides dimension storage 304 with three segment entries: main account, cost center, and department. These are specified as dimension storage segments 306, 308, and 310. An initial hierarchy is specified among all three dimension storage segments following the account number entry to disambiguate (332). Additional hierarchy may be specified by account rules after both initial segments are complete (334).

The example components, modules, data types, and interactions discussed in FIG. 1 through FIG. 3 are for illustration purposes only and do not constitute a limitation on embodiments. Logical COA with hashing may be implemented with other components, data types, and configurations using the principles described herein.

Figure 4:
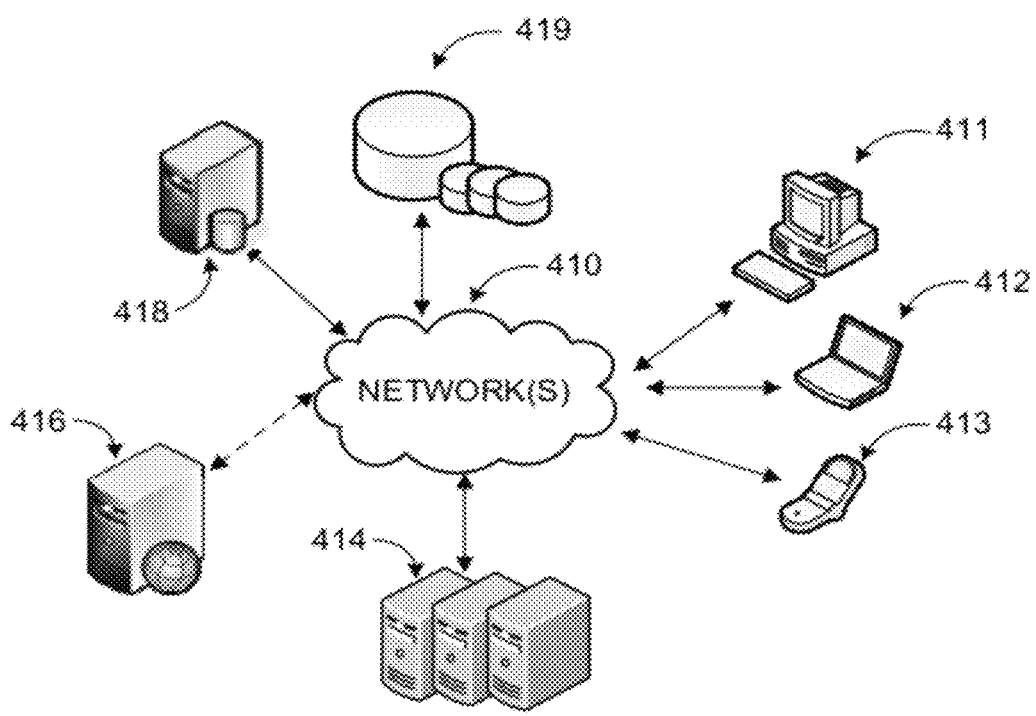
FIG. 4 is a networked environment, where a system according to embodiments may be implemented.

FIG. 4 is an example networked environment, where embodiments may be implemented. A platform providing enterprise resource planning services may generate and consume large amounts of combinational data such as combinations of accounts. Such a platform may be implemented via software executed over one or more servers 414 or a single server (e.g. web server) 416 such as a hosted service. The platform may communicate with client applications on individual computing devices such as a smart phone 413, a laptop computer 412, or desktop computer 411 ('client devices') through network(s) 410.

An ERP application, as part of the platform, may maintain the COA as a logical set of constraints, criteria, and relationships and not persist any of the valid combinations until a first time a particular combination is referenced. Upon first time use, a combination may be physically persisted reducing resource-cost and storage space. The ERP application may further employ a hash value associated with each combination such that lookups are simplified. When a physical combination is requested, the data may be hashed together using a predefined hash to obtain a value for the combination. The hash may be stored on the physical combination as a column such that looking up a particular combination involves an indexed lookup by the hash value. Data associated with the ERP operations may be stored directly or through database server 418 at data stores 419.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to implement logical COA with hashing in ERP systems. Furthermore, the networked environments discussed in FIG. 4 are for illustration purposes only. Embodiments are not limited to the example applications, modules, or processes.

Figure 5:
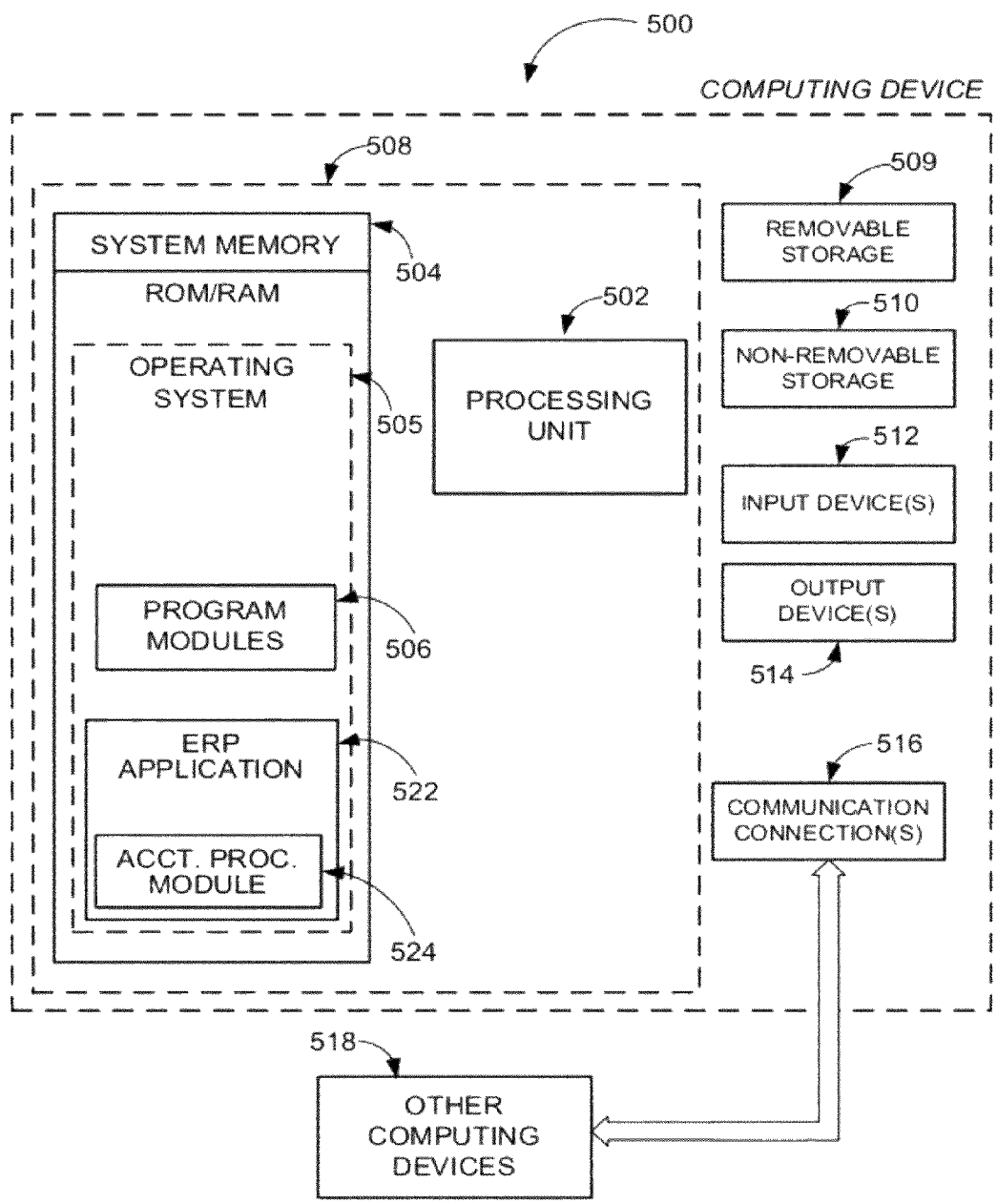
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be a server executing an ERP application and include at least one processing unit 502 and system memory 504. Processing unit 502 may have its own cache memory or use a dedicated portion of system memory 504 as cache. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, ERP application 522, and account processing module 524.

ERP application 522 may provide one or more of accounting, product lifecycle management, human resources, supply chain management, customer relationship management, warehouse management, and comparable services. Account processing module 524 may generate, filter, analyze, and store account and account combination data employing a logical COA with hashing as discussed previously. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that provide data storage services, consume data, and comparable devices. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 6:
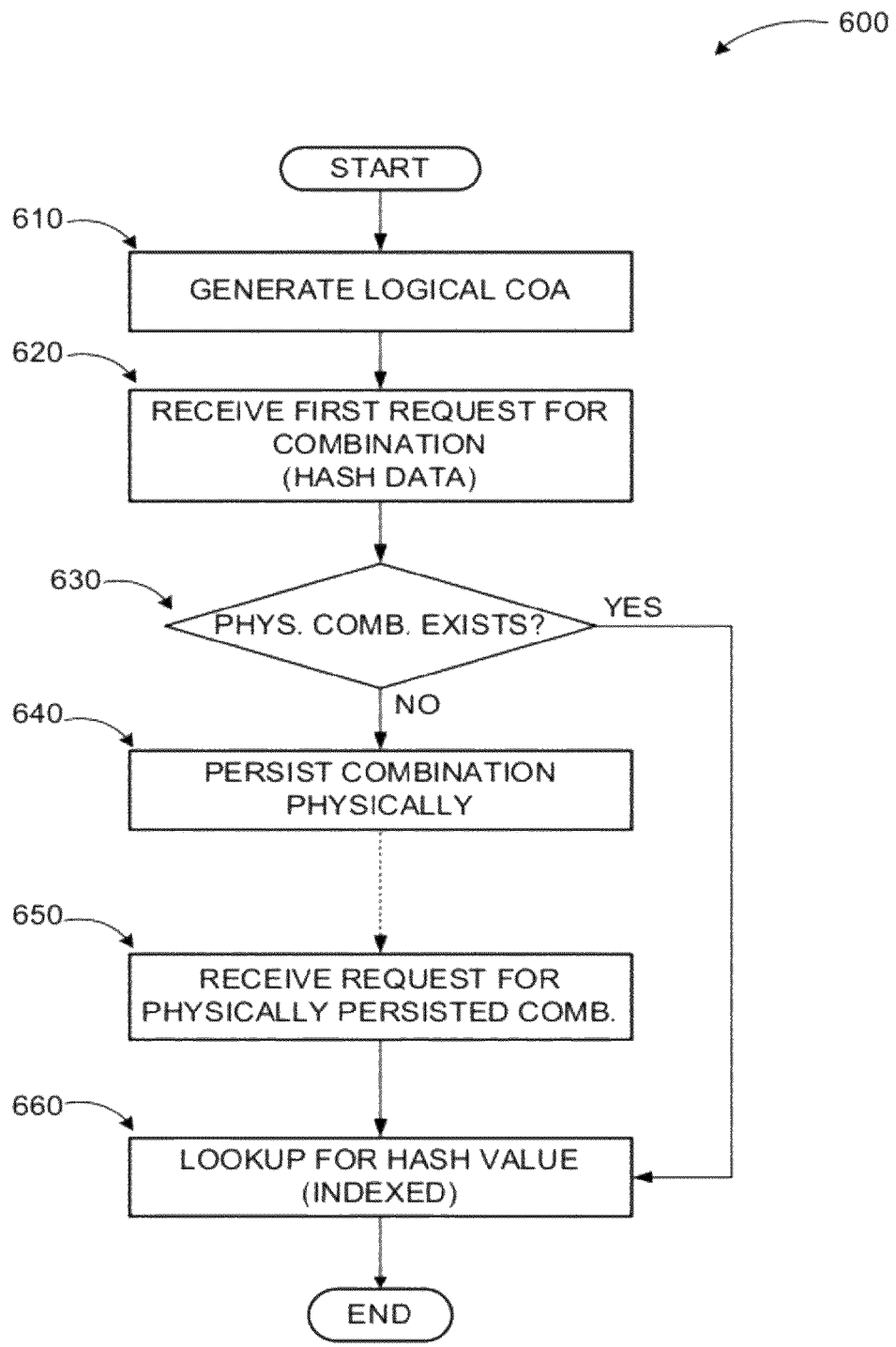
FIG. 6 illustrates a logic flow diagram for a process of employing logical COA with hashing in an ERP system according to embodiments.

FIG. 6 illustrates a logic flow diagram for process 600 of employing logical COA with hashing in an ERP system according to embodiments. Process 600 may be implemented in a server of an ERP system.

Process 600 begins with operation 610, where the COA is generated as a set of metadata, constraints, criteria, and relationships. The metadata defines which segments exist, what type of data they hold and in which structures for the COA. The constraints and criteria filter the set of valid combinations based on which values exist in other segments. This set may be further filtered through relationships, which categorize values or relate them directly with each other. These components may be stored as metadata in the system.

At operation 620, a first request for a combination may be received. The first request may be the first time business logic needs to reference the combination to track a value or set a property on it. At decision operation 630, a determination may be made whether the combination exists as a physical combination. If the combination does not already exist physically, it may be physically persisted at operation 640 and referenced if future business logic needs to reference it. At the time the physical combination is requested, the data may be hashed together using a predefined hash to obtain a value for the combination. This unique hash may be stored on the physical combination as a column.

At operation 650, a request for a physically persisted combination may be received (from a consumer or a logic process). In response, an indexed lookup by the hash value may be performed at operation 660 rapidly finding the combination. From there, all related data may be discovered by traversing standard foreign key relationships in the database.

The operations included in process 600 are for illustration purposes. An ERP system with logical COA employing hashing according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for providing logical Chart of Accounts (COA) in an Enterprise Resource Planning (ERP) system, the method comprising:
    defining a logical COA comprising metadata, constraints, criteria, and relationships, wherein the metadata defines existing segments, a type of data the segments hold, and structures for the logical COA, and wherein the constraints and the criteria filter a set of valid combinations based on which values exist in other segments;
    maintaining the logical COA without persisting combinations of the constraints, criteria, and relationships until a first time a combination is requested;
    in response to a request for the combination within the logical COA, determining whether the combination exists in a physical COA;
    if the combination does not exist in the physical COA, persisting the combination in the Physical COA;
    rendering the combination in the physical COA available for subsequent requests;
    employing a single unique identifier for non-transient combinations; and
    employing a first transient identifier for main combination of each transient combination and a set of second level transient identifiers for sub-combinations associated with a hierarchy of the main combination.

2. The method of claim 1, further comprising:
    hashing data associated with the combination employing a predefined hash; and
    performing a hash value lookup in response to the subsequent requests for the combination.

3. The method of claim 2, wherein the hash value is stored as a column within the physical COA.

4. The method of claim 2, wherein the hash value lookup is an indexed lookup.

5. The method of claim 2, further comprising:
    discovering data related to the physically persisted combination by traversing foreign key relationships in a database storing the physical COA.

6. The method of claim 2, wherein hashing the data associated with the combination includes:
    hashing at least two distinct structures within the combination employing at least two different hash input values and combining the hash input values into a single hash value for the lookup process.

7. The method of claim 1, wherein the metadata stores information about which dimension attributes exist and where values for the dimension attributes are stored.

8. The method of claim 1, wherein the request for the combination includes one of: a request from a consuming process, a reference to the combination by a business logic module, and a property setting action associated with the combination by a business logic module.

9. The method of claim 1, further comprising:
    maintaining the logical COA as metadata in the ERP system.

10. A computing device providing Enterprise Resource Planning (ERP) service with logical Chart of Accounts (COA), the computing device comprising:
    a memory;
    a processor coupled to the memory, the processor executing an ERP application associated with the ERP service, the ERP application configured to:
    define a logical COA comprising metadata, constraints, criteria, and relationships, wherein the metadata defines existing segments, a type of data the segments hold, and structures for the logical COA, and wherein the constraints and the criteria filter a set of valid combinations based on which values exist in other segments;
    maintain the logical COA without persisting combinations of the constraints, criteria, and relationships until a first time a combination is requested;
    in response to a request for the combination within the logical COA, determine whether the combination exists in a physical COA;
    if the combination does not exist in the physical COA, persist the combination in the Physical COA;
    abstract the persisting of the combination from consumers through a class library that ensures values in the combination physically exist when requested;
    hash data associated with the combination employing a predefined hash;

rendering the combination in the physical COA available for subsequent requests;

employ a single unique identifier for non-transient combinations; and employ a first transient identifier for main combination of each transient combination and a set of second level transient identifiers for sub-combinations associated with a hierarchy of the main combination.

11. The computing device of claim 10, wherein the physical COA is stored in a data store communicatively coupled to the computing device and the hash value is stored in an index a column of the combination within the physical COA.

12. The computing device of claim 10, wherein the metadata is configured to define existing segments and a type of data maintained by the existing segments, the constraints are configured to filter valid combinations based on existing values in other segments, the criteria are configured to further filter the valid combinations based on existing values in other segments, and the relationships are configured to further filter the valid combinations based on at least one of categorizing values and relating the values with each other, and wherein the logical COA is stored as metadata in the memory.

13. The computing device of claim 10, wherein the constraints are represented as a hierarchical tree where each node includes at least one criterion indicating when that node is valid.

14. The computing device of claim 13, wherein value combinations are stored on transactions as a single reference identifier into a combination table in the logical COA.

15. The computing device of claim 10, wherein the metadata includes at least one from a set of: a dimension attribute, a dimension attribute category, and a dimension hierarchy.

16. The computing device of claim 15, wherein the dimension attribute defines a type of a dimension, the dimension attribute category defines a category for the dimension attribute if the dimension attribute is categorized, and the dimension hierarchy defines an order and a link among the dimension attributes.

17. A computer-readable memory device with instructions stored thereon for providing logical Chart of Accounts (COA) in an Enterprise Resource Planning (ERP) system, the instruction comprising:

defining a logical COA comprising metadata, constraints, criteria, and relationships, wherein the metadata defines existing segments, a type of data the segments hold, and structures for the logical COA, and wherein the constraints and the criteria filter a set of valid combinations based on which values exist in other segments;

maintaining the logical COA without persisting combinations of the constraints, criteria, and relationships until a first time a combination is requested, wherein the logical COA is stored as metadata in a computing device memory;

in response to a request for the combination within the logical COA, determining whether the combination exists in a physical COA, wherein the physical COA is stored in a physical data store communicatively coupled to the computing device;

if the combination does not exist in the physical COA, persisting the combination in the Physical COA;

abstracting the persisting of the combination from consumers through a class library that ensures values in the combination physically exist when requested;

hashing at least two distinct structures within the combination employing at least two different predefined hashes;

combining the hashed into a single hash value stored in an index column of the combination within the physical COA;

rendering the combination in the physical COA available for subsequent requests through a hash value lookup in response to the subsequent requests for combination;

employing a single unique identifier for non-transient combinations; and employing a first transient identifier for main combination of each transient combination and a set of second level transient identifiers for sub-combinations associated with a hierarchy of the main combination.

18. The computer-readable memory device of claim 17, wherein the hashes are computed as a multi-byte value based on user input.

19. The computer-readable memory device of claim 17, wherein the hashes are computed from at least one of a total number, an identifier, and a value of each segment; at least one of a total number, an identifier, and an order of each hierarchy; a number of segments related to each hierarchy, and a transient status indicator.

* * * * *